Oct. 5, 1965 P. DERRUPPE 3,209,930

MECHANICAL SHOVELS

Filed Dec. 5, 1962 3 Sheets-Sheet 3

United States Patent Office 3,209,930
Patented Oct. 5, 1965

3,209,930
MECHANICAL SHOVELS
Pierre Derruppe, 375 Ave. de Tivoli, Le Bouscat,
Bordeaux, France
Filed Dec. 5, 1962, Ser. No. 242,555
1 Claim. (Cl. 214—140)

The present invention relates to mechanical shovels, i.e., machines comprising a shovel scoop mounted on the end of two lateral arms articulated by links, in the front of a small vehicular chassis. Such devices are used for public works and civil engineering projects.

When in operation, the arms are lowered towards a pile of rubble, bricks, or the like which is to be removed, and the vehicle is then advanced to thrust the shovel scoop into the pile and, finally, the arms are raised. The arms thus follow a curved trajectory, the radius of which should be as great as possible and is a function of the length of the links. In order that these links are not of excessive length, suitable positions of the links have been determined, enabling the arms to follow a relatively flat curve. These devices are nevertheless complicated and costly since they require a large number of links and, consequently a large number of joints. Moreover, these joints are subject to binding and it is an object of the invention to limit the number thereof.

It is a further object of the invention to enable a shovel trajectory to be obtained with a very flat curve, by means of one pair of two links.

To this end, the invention provides a mechanical shovel comprising a shovel scoop mounted on two lateral arms, each articulated to a chassis by means of links, the link closest to the shovel scoop for each arm being longer than the other, and the pivots connecting the links to the chassis being further apart than those connecting the links to the arms.

Figure 1:
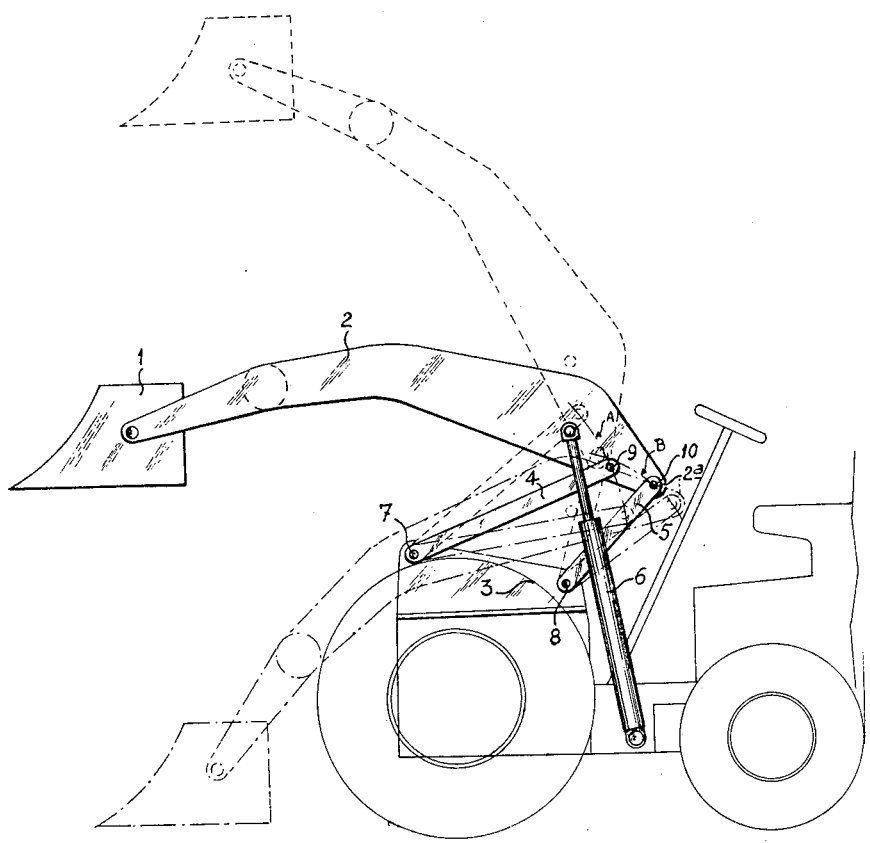
Figure 2:
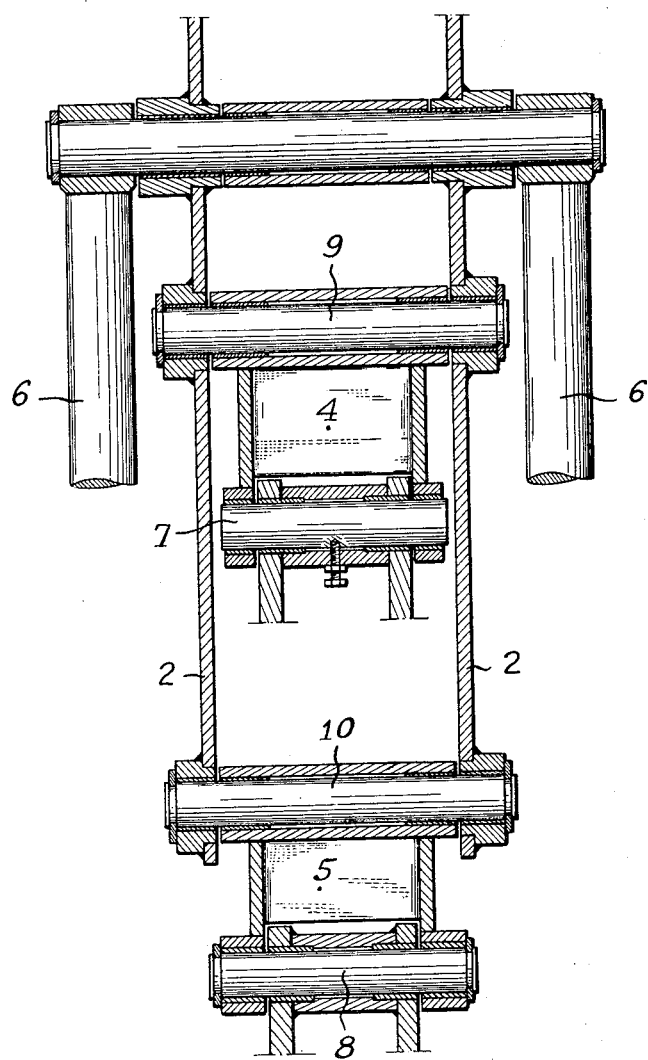
Figure 3:
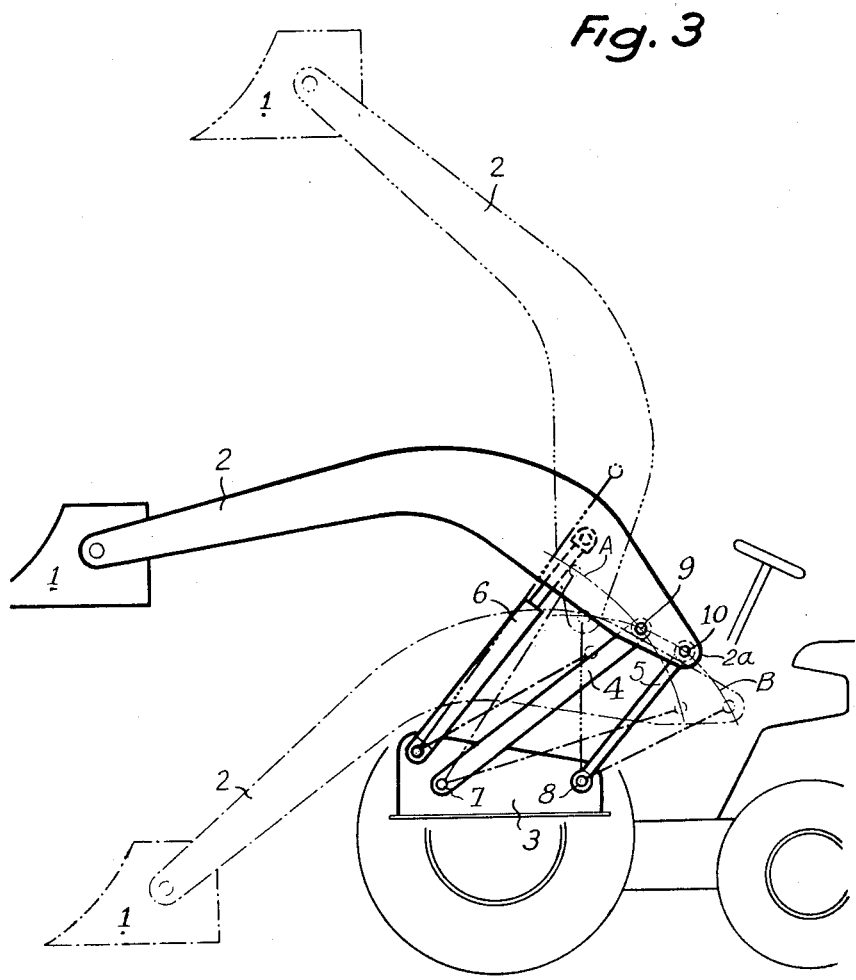

In order that the invention may be more clearly understood, reference will now be made to the accompanying drawings which show two embodiments thereof by way of example only, and in which:

FIGURE 1 shows a diagrammatic sectional view of a first embodiment of a mechanical shovel according to the invention, FIGURE 2 shows, for the raised position of the shovel, a cross-section through the articulation axis along the line II—II in the arrangement of FIGURE 1, and FIGURE 3 shows a diagrammatic sectional view of a second embodiment.

Referring to the shovel as shown in the drawings in FIGURES 1 and 2, this comprises a shovel scoop 1 mounted on two lateral arms 2 (only one is shown in FIGURE 1) which are articulated to a vehicular chassis 3 by means of links 4 and 5, and are also connected to the operating rod of a jack 6.

In accordance with the invention, the link 4 of each arm 2 is longer than the link 5, and the pivots 7 and 8 connecting the links 4 and 5 to the chassis 3 are farther apart than the pivots 9 and 10 connecting these links 4 and 5 to the arm 2.

Thus, when in the lowermost position (shown in chain-dotted lines), the links are greatly inclined to the horizontal and the end 2a of the arms 2 which is furthermost from the shovel scoop 1 occupies a foremost position in relation to the vehicle. By operating the jack 6 the arms 2 are raised and the arrangement of the links causes the arm 2 to move forwards at the same time as pivoting upwards, this movement consequently causing the shovel scoop 1 to have a very flat trajectory. In point of fact it is seen that in order to move from the lowermost position to the uppermost position (shown in a dotted line), the pivot 9 describes an arc of a circle A whereas the pivot 10 describes the arc of a circle B and it is seen that end 2a is clearly moved towards the front of the vehicle.

FIGURE 3 shows an embodiment in which the jack 6 is articulated to the chassis 3 in front of the links 4 and 5 instead of being behind as shown in FIGURE 1. The jack 6 is moreover located inside the mechanism, i.e., between the links which themselves are located between the arms 2. By this means, the chassis 3 is considerably simplified, the distribution of stresses on the links is improved, and greater power is obtained at the end of travel.

The invention is not limited to the embodiments described and shown but, on the contrary, covers all modifications thereof.

I claim:

A shovel loader comprising: a chassis; a shovel scoop, two lateral arms supporting said scoop; two pairs of links, each pair of which is associated with a respective one of said arms; one link of each of said pairs being longer than the other, each of said links being inclined to the horizontal; means pivotally connecting the lower extremity of each link to the chassis about a respective axis, the axes being mutually spaced at approximately the same level on said chassis, the longer link of each pair being connected to the chassis at a location closer to said shovel than that of the shorter link of each pair; means pivotally connecting the shorter link of each pair to its respective arm; means pivotally connecting the longer link of each pair to its respective arm at a location between said shovel and the connection of the shorter link of its respective pair to said respective arm, the connection of each pair of links being such that the locations where the links of each pair are connected to their respective arm are closer together than the locations where they are connected to the chassis; at least one jack for actuating said shovel; means pivotally connecting the lower end of said jack to said chassis for rotation about an axis at substantially the same level as said spaced axes; and means pivotally connecting the upper end of said jack to at least one of said arms at a location between said shovel and said means connecting the respective longer link to the latter said arm such that when the jack is extended the links undergo pivotal movement to cause rotation of the arms and raising of the scoop.

References Cited by the Examiner
UNITED STATES PATENTS

| 1,226,261 | 5/17 | Rosendahl | 214—149 |
| 1,611,860 | 12/26 | Richey | 214—131 |
| 2,538,000 | 1/51 | Hoar et al. | 214—140 |
| 2,563,974 | 8/51 | Thierry | 214—148 X |
| 2,593,500 | 4/52 | Thierry | 214—148 |
| 2,698,697 | 1/55 | Holopainen. | |

FOREIGN PATENTS

| 1,240,379 | 7/60 | France. |

HUGO O. SCHULZ, *Primary Examiner.*